United States Patent
Flowers

(10) Patent No.: US 7,719,664 B1
(45) Date of Patent: May 18, 2010

(54) IMAGING SEMI-ACTIVE LASER SYSTEM

(75) Inventor: Edward Max Flowers, Grand Prairie, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 207 days.

(21) Appl. No.: 11/279,435

(22) Filed: Apr. 12, 2006

(51) Int. Cl.
*G01P 3/36* (2006.01)

(52) U.S. Cl. .......................... 356/29; 356/28; 356/5.01; 356/5.15

(58) Field of Classification Search ....... 356/3.01–3.15, 356/4.01–4.1, 5.01–5.15, 6–22, 28, 28.5, 356/29

See application file for complete search history.

(56) References Cited

U.S. PATENT DOCUMENTS

| | | | | |
|---|---|---|---|---|
| 6,626,396 | B2 * | 9/2003 | Secker | 244/3.16 |
| 2004/0004707 | A1 * | 1/2004 | DeFlumere | 356/4.01 |
| 2006/0232761 | A1 * | 10/2006 | McConville et al. | 356/5.1 |
| 2007/0008514 | A1 * | 1/2007 | Krasutsky | 356/4.01 |

FOREIGN PATENT DOCUMENTS

GB  EP 0 770 884 A1  2/1997
GB  EP 0 833 122 A1  1/1998

OTHER PUBLICATIONS

Communication relating to the results of the Partial International Search Report from counterpart International Application No. PCT/US2007/066413.
International Search Report and Written Opinion mailed Nov. 12, 2008.

* cited by examiner

*Primary Examiner*—Thomas H Tarcza
*Assistant Examiner*—Luke D Ratcliffe
(74) *Attorney, Agent, or Firm*—Williams Morgan & Amerson, P.C.

(57) ABSTRACT

A method and apparatus image a target in a SAL system. The method includes receiving on-board a platform a target designation originating from a laser source off-board the platform; homing the platform on a target responsive to the received target designation; imaging the target from the target designation; and aiming the platform at a point on the target selected from the image. The apparatus includes a receiver capable of receiving and imaging a target designation originating from a laser source off-board the apparatus; at least one flight control mechanism; and a controller. The controller is capable of processing a received target designation and issuing navigation control guidance commands to the flight control mechanism to: home the apparatus on a target responsive to a received target designation; and aim the apparatus at a point on the target selected from the image of the target.

46 Claims, 6 Drawing Sheets

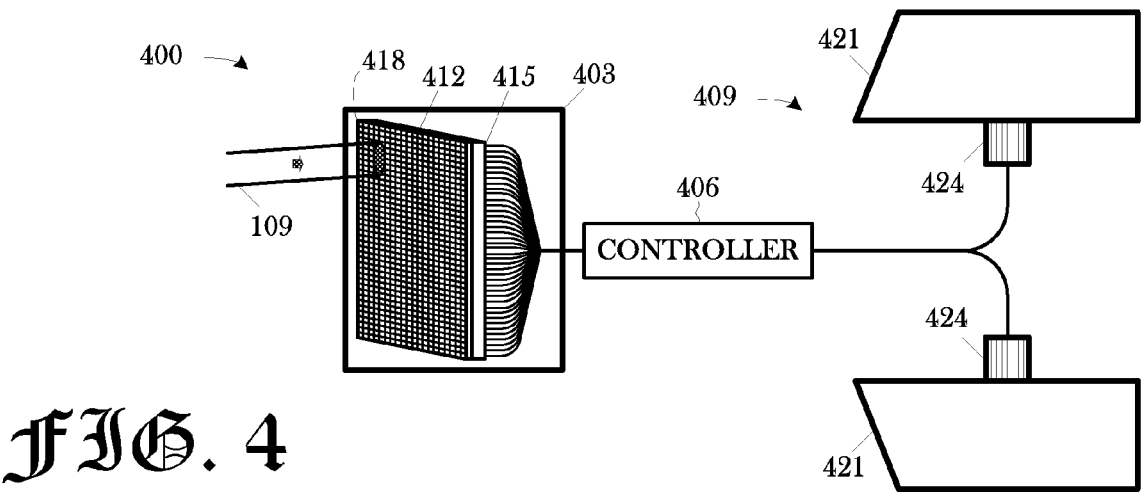
FIG. 4
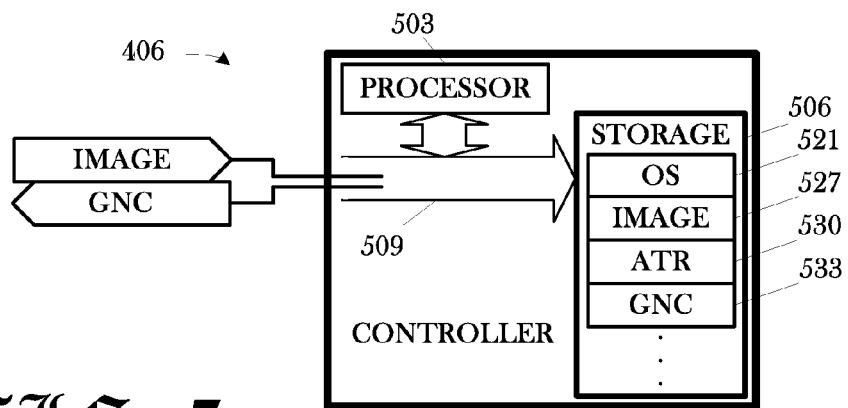
FIG. 5
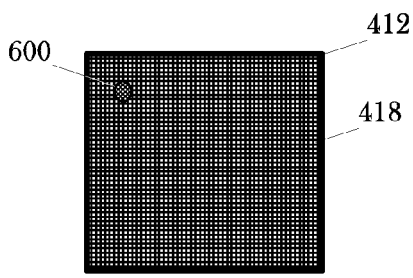 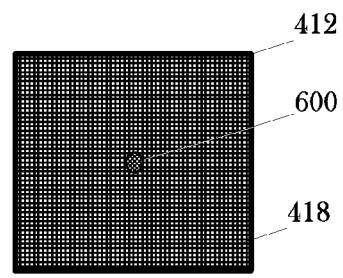
FIG. 6A    FIG. 6B

IMAGING SEMI-ACTIVE LASER SYSTEM

BACKGROUND OF THE INVENTION

1. Field of the Invention

The present invention pertains to semi-active laser systems and, more particularly, to an imaging semi-active laser system.

2. Description of the Related Art

A need of great importance in military and some civilian remote sensing operations is the ability to quickly detect, locate, and/or identify objects, frequently referred to as "targets," in a "field of view" or in an "instantaneous field of view" within a "field of regard." In this sense, the field of view is the portion of the environment being remotely sensed at a particular moment. A field of regard is the total area being remotely sensed. A field of regard may comprise several fields of view.

Remote sensing techniques for the tasks mentioned above have existed for many years. For instance, in World War II, the British developed and utilized radio detection and ranging ("RADAR") systems for detecting and tracking the incoming planes of the German Luftwaffe. Sound navigation and ranging ("SONAR") has found similar utility and application in environments where signals propagate through water, as opposed to the atmosphere. While RADAR and SONAR have proven quite effective in many areas, they are inherently limited by a number of factors. For instance, RADAR is limited because of its use of radio frequency signals and the size of the resultant antennas used to transmit and receive such signals. Sonar suffers similar types of limitations. Thus, alternative technologies have been developed and deployed.

Some of these alternative technologies are optical in nature. One such alternative technology is laser detection and ranging ("LADAR"). Instead of radio or sound waves, LADAR systems transmit laser beams and receive reflections from targets. Because of the short wavelengths associated with laser beam transmissions, LADAR data can exhibit much greater resolution than RADAR data in the right contexts. LADAR systems have exhibited significant versatility, and can be used for automatic target recognition ("ATR"), targeting, direction finding, and other, similar tasks. Thus, there are many kinds of LADAR systems, and they may be categorized in a number of ways.

One useful categorization is whether the system is "active" or "semi-active", which centers on the point at which the detected laser signal is introduced into the field of regard. For instance, the laser signal may be introduced into the field of regard from on board the same platform from which its reflection is detected. Such systems are known as "active" systems. The laser signal may alternatively be introduced from a third party source off board the platform from which the reflection is detected. Such systems are known as "semi-active" laser ("SAL") systems.

Another useful categorization in active systems is whether the system is a "scanned" system or a "flash" system. In some systems, the laser is mounted on a gimbal, which is then used to scan the LADAR signal in azimuth and in elevation into the field of regard, which will comprise many instantaneous fields of view. The receipt of the reflection is synchronized with the transmission of the LADAR signal. This permits determination of the "flight time" for the LADAR signal, from which the range to the point of reflection can be determined. The reflected LADAR signal is also received as a function of the angle at which it impinges upon the platform. Thus, the received reflection can be mapped into a three-dimensional image of the field of view. A flash system works in much the same fashion, except there is no scanning, and so the image is of a field of view.

Note that SAL systems are distinguishable from active systems in at least one important respect. In both scanned and flash active systems, receipt can be synchronized with transmission since transmission occurs on-board. However, in SAL systems, there can be no synchronization since the laser signal originates off-board. An absolute range to the target therefore cannot be determined. Consequently, SAL systems are not used in imaging, which permits simplification of the receiver. SAL systems typically employ what are known as "quad cell detectors," which are optical detectors comprised of four cells. The apparatus including the SAL system is guided to maintain the receipt of the reflected laser signal in the center of the four cells.

These types of technological distinctions strongly influence the end use of the LADAR system. For instance, active systems can image, and so are used in conjunction with automatic target recognition systems such that they can automatically locate, identify, and home on a target without direct human intervention. This is not true of SAL systems, generally, because they cannot image. Typically, SAL systems are used in contexts where a target is spotted with a target designation for an off-board source and the apparatus including the SAL system follows the reflection to the target.

Each type of system has relative advantages and disadvantages. SAL systems require highly accurate pointing of the designator laser spot on the target. The weapon will hit the spot, but atmospherics and instability of the spot's position will vary the aim point for the weapon on the target. If too large of a portion of ground in front of the target is illuminated, and that ground has green foliage, then the SAL system will point low, such that the weapon might impact the ground in front of the target. Scanning LADAR systems require a high repetition rate laser that provides very accurate target information and an impressive ATR capability, but the entire system is destroyed when the weapon is destroyed—including the laser and ATR system. Flash LADAR provides a non-scanning system with a simpler optical path with the same ATR capability. However, flash LADAR is very limited because of the need from a very high power laser for scene illumination that is subsequently destroyed when the weapon hits the target.

The present invention is directed to resolving, or at least reducing, one or all of the problems mentioned above.

SUMMARY OF THE INVENTION

The invention includes, in its various aspects and embodiments, a method and apparatus for imaging in a SAL system. The method comprises receiving on-board a platform a target designation originating from a laser source off-board the platform; homing the platform on a target responsive to the received target designation; imaging the target from the target designation; and aiming the platform at a point on the target selected from the image. The apparatus comprises a receiver capable of receiving and imaging a target designation originating from a laser source off-board the apparatus; at least one flight control mechanism; and a controller. The controller is capable of processing a received target designation and issuing navigation control guidance commands to the flight control mechanism to: home the apparatus on a target responsive to a received target designation; and aim the apparatus at a point on the target selected from the image of the target. Still other aspects and embodiments are presented below.

BRIEF DESCRIPTION OF THE DRAWINGS

The invention may be understood by reference to the following description taken in conjunction with the accompanying drawings, in which like reference numerals identify like elements, and in which:

FIG. 4 depicts the detection of the target designation and control of the flight control mechanisms of the weapon first shown in FIG. 1A;

FIG. 5 depicts a controller first shown in FIG. 4 on board the weapon of FIG. 1A-FIG. 1B;

FIG. 6A-FIG. 6B conceptually illustrate the detection of the target designation in FIG. 1A as the weapon homes on the target in the first, long range mode of operation;

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1A:
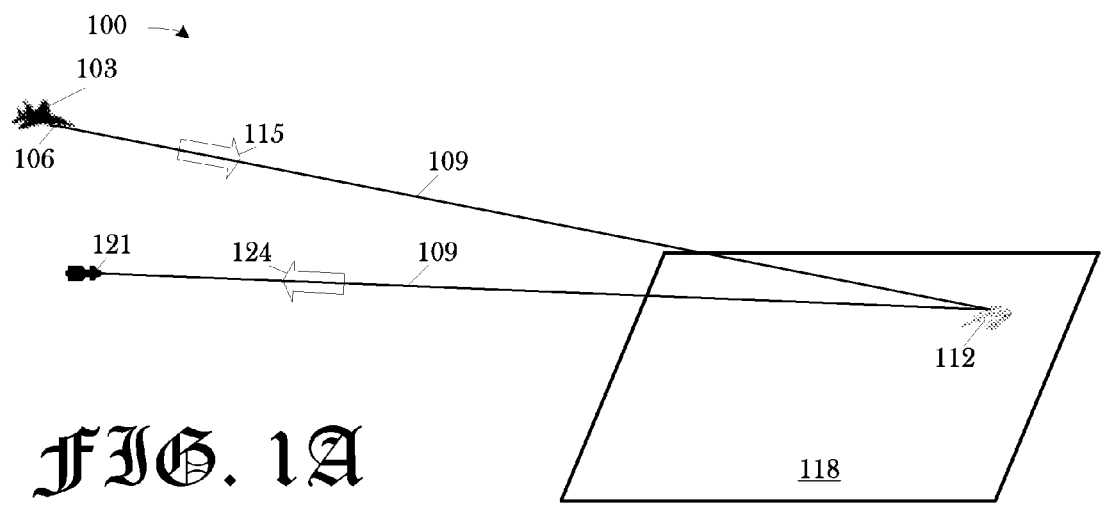
FIG. 1A-FIG. 1B illustrate one particular scenario in accordance with a first embodiment of one aspect of the present invention in long range and short range modes, respectively.
Figure 1B:
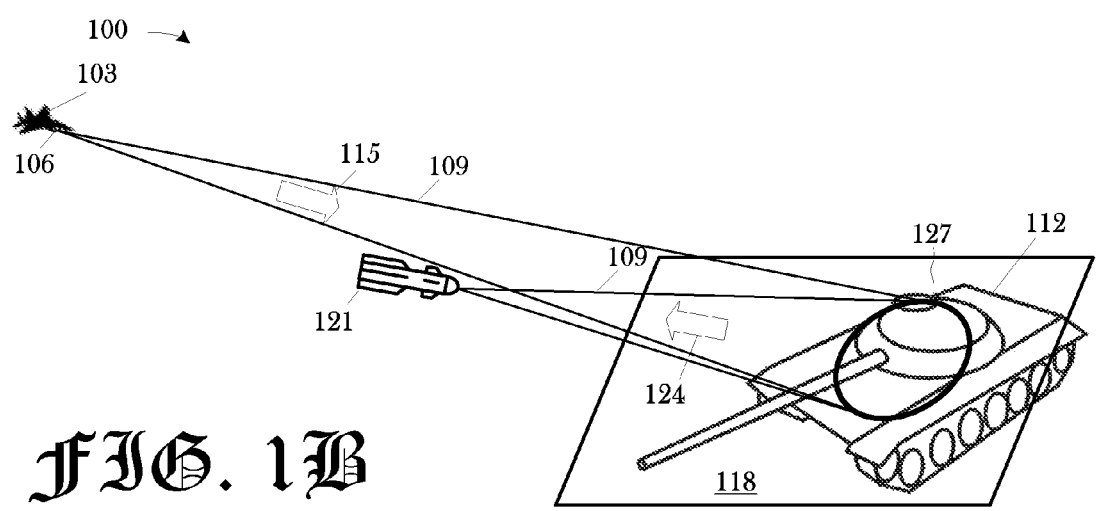

Turning now to the drawings, FIG. 1A-FIG. 1B illustrate portions of a scenario 100 performed in accordance with a first embodiment of one aspect of the present invention. FIG. 1A depicts what is referred to herein as a "long range" mode of operation during the scenario 100. FIG. 1B depicts what is referred to herein as a short range mode of operation. In the scenario 100, and in general, a platform 103 includes a designator 106, from which originates a target designation 109. The target designation 109 is directed to a target 112, as indicated by the arrow 115. The target 112 is located in a field of view 118 for a weapon 121. The target designation 109 is reflected to the weapon 121, as indicated by the arrow 124.

In the illustrated embodiment, the platform 103 is a fighter aircraft, such as an F-16 Falcon, F-22 Raptor, or a Joint Strike Fighter ("JSF") as are either currently deployed or under development by the United States military. However, the invention is not so limited. The platform 103 may be implemented with, for instance, an unmanned aerial vehicle ("UAV"), such as the Predator UAV, also currently deployed by the United States military. Alternative embodiments may even implement the platform 103 as a manned unit or an ocean going vessel such that the platform 103 is not necessarily airborne or a vehicle, or even military in nature.

The designator 106 may be implemented using any conventional laser designator known to the art for use in SAL systems. The illustrated embodiment implements the designator 106 using a SNIPER® Targeting Pod manufactured by Lockheed Martin Corporation. The SNIPER® includes a high-resolution, mid-wave third-generation forward looking infrared ("FLIR") sensor; a dual-mode laser; and a charge-coupled device television ("CCD-TV") sensor, along with a laser spot tracker and a laser marker—none of which are shown. It incorporates a variety of advanced image processing algorithms in its target/scene imager with inertial tracker and includes a variety of stabilization techniques. The SNIPER® provides automatic tracking and laser designation of tactical size targets via real-time imagery presented on cockpit displays. Other capabilities include passive air-to-air detection and tracking and passive ranging. The SNIPER® has a wide field of view of 4° and a narrow field of view of 1.0°, and has a field of view from +35° to −155° in pitch and continuous in roll.

Information regarding the SNIPER®, its operation, and its performance is widely available in the public domain. Additional information is available directly from Lockheed Martin Corporation at:

Lockheed Martin Corporation
Missiles and Fire Control
Business Development
Phone: (407) 356-4464
Fax: (407) 356-7199
<www.lockheedmartin.com/mfc>

Lockheed Martin has information specific to the SNIPER® targeting pod available online at <http://www-.missilesandfirecontrol.com/our_products/combatvision/SNIPER/product-SNIPER_XR.html#>. However, additional information is readily available in the public domain from third parties, as well.

Figure 2:
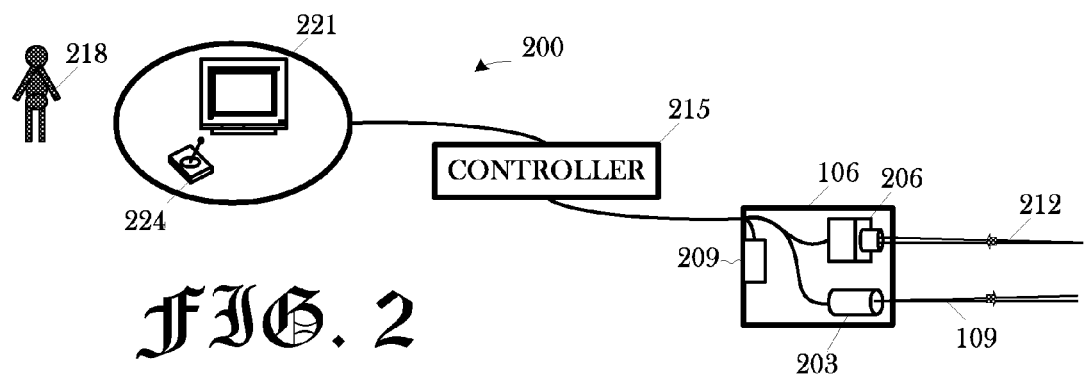
FIG. 2 depicts the designation of the target first shown in FIG. 1A from on board the platform.

FIG. 2 depicts that portion of the designation of the target 112, first shown in FIG. 1A, that occurs on board the platform 103. More particularly, FIG. 2 conceptually illustrates a portion 200 of the command and control ("2C") architecture of the platform 103 relative to the present invention. Note that, as will be appreciated by those skilled in the art having the benefits of this disclosure, the 2C architecture of the platform 103 is much more complex and involved. However, details unrelated to the present invention have been omitted for the sake of clarity and so as not to obscure the present invention.

The designator 106 is shown having laser source 203, an imaging sensor 206, and an actuator 209. The laser source 203 generates the target designation 109. The imaging sensor 206 receives radiation 212 from the field of view 118, shown in FIG. 1A, and generates image data representative thereof. Again, as noted above, the imaging sensor 206 is a FLIR sensor, a CCD-TV sensor, or both. The actuator 209 moves the designator 106 and its components responsive to 2C commands issued by the controller 215 as described further below. The actuator 209 may comprise, for example, multiple motors (not shown) for motion and stabilization of the designator 106 and its components in azimuth and elevation that may be distributed throughout the designator 106.

Figure 3:
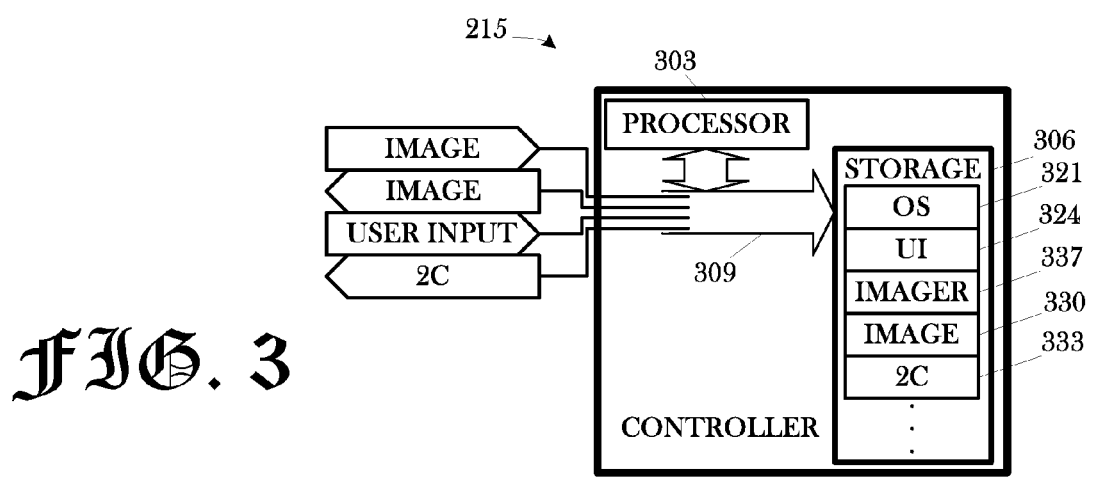
FIG. 3 depicts a controller first shown in FIG. 2 on board the platform of FIG. 1A-FIG. 1B.

FIG. 3 depicts selected portions of the controller 215 first shown in FIG. 2 in a block diagram. The controller 215 includes a processor 303 communicating with storage 306 over a bus system 309. In general, the controller 215 will handle a fair amount of data, some of which may be relatively voluminous by nature and which is processed quickly. Thus, certain types of processors may be more desirable than others for implementing the processor 303. For instance, a digital signal processor ("DSP") may be more desirable for the illustrated embodiment than will be a general purpose microprocessor. In some embodiments, the processor 303 may be implemented as a processor set, such as a microprocessor with a mathematics co-processor.

The storage 306 may be implemented in conventional fashion and may include a variety of types of storage, such as a hard disk and/or random access memory ("RAM"). The storage 306 will typically involve both read-only and writable memory implemented in disk storage and/or cache. Parts of the storage 306 will typically be implemented in magnetic media (e.g., magnetic tape or magnetic disk) while other parts may be implemented in optical media (e.g., optical disk). The present invention admits wide latitude in implementation of the storage 306 in various embodiments. The storage 306 is also encoded with an operating system operating system ("OS") 321, some user interface ("UI") software 324, an imager 327, the image 330, and a 2C application 333. The processor 303 runs under the control of the OS 321, which may be practically any operating system known to the art.

Referring now to both FIG. 2 and FIG. 3, the controller 215 receives the image 330 from the imaging sensor 206 and stores it on the storage 306. The image 330 may be stored in any suitable type of data structure known to the art, such as a first-in, first-out ("FIFO") queue. The imager 327, having been invoked by the processor 303, renders an image from the image data that is then output to the operator 218. The UI 324, having been invoked by the processor 303 upon startup, displays the image to the operator 218 on the display 221. The operator 218 then uses a pointing device 224, i.e., a joystick, to indicate that the designator 106 is to designate the target 112, shown in FIG. 1A.

The indication of the operator 218 ("USER INPUT") is input to the controller 215 via the UI 324. The 2C application 333 takes the user's indication and issues 2C commands ("2C") to the actuator 209 of the designator 106. The actuator 209 then issues the appropriate control signals to the motors (not shown) that move the designator 106 and/or its appropriate components to implement the designation of the target 112 as indicated by the operator 218. In this particular embodiment, this process is iterated continuously as the weapon 121 approaches, or homes on, the target 112.

So, in the illustrated embodiment, the designator 106 acquires data regarding the field of view and renders an image from it that is presented to the operator 218 of the platform 103. The operator 218 then designates the target 112 from the designator 106 from the presented image. As the scenario 100 develops, the designator 106 continues collecting data from which the image is continuously rendered and presented to the operator 218, and the operator 218 continuously designates, or "spots", the target 112.

Note that, in this embodiment, the designator 106 provides additional functionality described above that facilitate the operator 218's efforts at designating the target 112. However, any laser designator known to the art as suitable for SAL system operation may be used. Many of the functionalities associated with the SNIPER®, although useful in the illustrated embodiment, are superfluous relative to the invention. This is especially true with, for example, target tracking and image stabilization. These superfluous functionalities may therefore be omitted in some alternative embodiments. For instance, in embodiments where the designator 106 is a part of a manned unit, size and weight constraints are very different and may reduce the desirability of certain types of sensors that provide these extra functionalities. Consequently, the designator 106 discussed above is, by way of example and illustration, but one exemplary means for designating the target 112.

The target 112 in the illustrated embodiment is an armored vehicle and, more particularly, a tank. However, the invention is not limited to ground targets or vehicles. The target 112 may be, in alternative embodiments, a naval warship or a hovering helicopter. Or, the target 112 may be some type of infrastructure, such as a munitions depot or a fortification. The application of the invention is not limited by the nature of the target 112. However, as will be appreciated by those in the art having the benefit of this disclosure, some types of targets are less amenable than others. For example, it will be more difficult to maintain a good, stable designation on a fast moving target, such as a fighter aircraft, than it will be on a stationary target, such as a munitions depot. Note that the nature of the anticipated target may affect the implementation of the weapon 121. For instance, some types of weapons are particularly designed for effectiveness against armored vehicles, or against underground bunkers.

The weapon 121 may be any weapon suitable for use in a SAL system modified as described below to implement the invention. Suitable weapons in this respect include the HELLFIRE® missile, small diameter bomb ("SDB"), and other laser guided bombs. The illustrated embodiment implements the weapon 121 in a modified HELLFIRE® missile, about which much information is available from the public domain. More particularly, the illustrated embodiment employs any one of several modified variants of the HELLFIRE® missile produced by Lockheed Martin Corporation known as the HELLFIRE II™, from whom additional information is available at the contact information provided above. Lockheed Martin has information specific to the HELLFIRE II™ missile available online at <http://www.missilesandfirecontrol.com/our_products/antiarmor/HELLFIRE/product-HELLFIREII.html>.

In general, the HELLFIRE II™ is a modular missile system provides multiple warheads and guidance systems and includes anti-armor and anti-shipping warhead configurations, with Longbow millimeter wave ("MMW"); SAL with an anti-tank high explosive and a blast fragmentation warhead; and imaging infrared ("I2R") guidance systems. The present invention employs the SAL configuration of the HELLFIRE II™ missile. The HELLFIRE II™ in this configuration provides precision targeting for main battle tanks, ships, air defense systems, buildings and bunkers. The HELLFIRE II™ has a range of approximately 0.5 km to 8+ km.

Note the HELLFIRE II™ and other such weapons currently in production are not suitable off the shelf. Presently available weapons will need to be modified in order to implement the present invention. In general, the modification will be in the form of modifications of both the hardware and software for the weapon. The ease or difficulty of such modification will depend on the particular implementation. However, such modifications are periodically made to such weapons and the procedures are well known and documented. Those of ordinary skill in the art should be able to readily modify such existing weapons to modify the present invention upon receiving the benefit of the disclosure herein. However, weapons designs can be changed in accordance with the teachings herein so that newly produced weapons may implement the invention off the shelf.

More particularly, the detector of such weapons will need to be changed out and an automatic target recognition ("ATR") system added. As noted above, SAL systems typically use what is known as a "quad cell" detector. As the target designation impinges upon the quad cell detector, the weapon is guided to center the impingement on the quad cell detector. However, this is insufficient for implementing the present invention and the quad cell detector is exchanged for, in the illustrated embodiment, a LADAR flash detector array. SAL systems also typically omit any form of an ATR. However, in at least one mode of operation, the invention employs an ATR and so an ATR is ported onto the weapon.

FIG. 4 conceptually depicts a selected portion 400 of the 2C architecture of the weapon 121 relative to the present invention and its operation. Note that, as will be appreciated by those skilled in the art having the benefits of this disclosure, the 2C architecture of the weapon 121 is much more complex and involved. However, details unrelated to the present invention have been omitted for the sake of clarity and so as not to obscure the present invention.

The portion 400 depicts a receiver 403, a controller 406, and a flight control mechanism 409. The receiver 403 comprises a flash array detector 412 and associated electronics 415. The flash array detector 412 comprises a plurality of detectors 418 (only one indicated) that detect the reflected target designation 109 and output a signal that is conditioned by the electronics 415 and output to the controller 406. The controller 406 then outputs guidance navigation control ("GNC") commands to the flight control mechanism 409 to guide the weapon 121 to the target 112.

More particularly, the impingement 600, first shown in FIG. 6A, of the target designation 109 on the detector array 412 elicits an electromagnetic response in the material of each detector 418. The material is "tuned" to detect the impingement of electromagnetic radiation in the wavelength of the target designation 109. The electronics 415 condition the electromagnetic response and output data representative of the intensity of the impingement 600 on the respective detector 418. The electronics 415 are typically manufactured as a read-out integrated circuit ("ROIC") and comprises a plurality of "unit cells" (not shown), one for each detector 418. Each unit cell comprises circuitry to capture the electromagnetic response in the detector 418 and operates independently of the others.

The size of the array is not material to the practice of the invention. In general, it should be large enough to provide the desired resolution in the second, short range mode of the present invention described further below. However, implementation-specific size and weight constraints will typically impose an upper bound on the size of the array. The size of the array is therefore an implementation specific detail that will vary from embodiment to embodiment and whose selection will be readily within the skill of those ordinarily skilled in the art once they have the benefit of the present disclosure.

Flash detector arrays are well known in the art, and suitable flash detector arrays are commercially available off the shelf. One particular implementation employs a detector array available from:
Advanced Scientific Concepts
305E. Haley St.
Santa Barbara, Calif. 93101

Additional information regarding this flash detector array is available from R. Richmond, "Under Cover-Flash Laser Radar System Sees Obscured Targets", SPIE's oemagazine 18 (April 2005) (also available online at http://oemagazine.com/fromTheMagazine/apr05/undercover.html).
Advanced Scientific Concepts refers to this particular flash detector array as the "Modular Flash LADAR Camera," although it is not really a camera. As is implied in that article, flash detector arrays are deployed in conventional practice with the laser of the designator. Note the distinction from the present invention, in which the laser of the designator is deployed separately from the flash detector array, and therefore contrary to conventional practice.

However, any suitable technology may be used to detect the reflected target designation 109. Thus, the flash array detector 412 is, by way of illustration and example, but one means for detecting the reflected target designation 109. Note also that the implementation of the electronics 415 will depend, to at least some degree, on the implementation of the flash array detector 412.

FIG. 5 depicts selected portions of the controller 406, first shown in FIG. 4, in a block diagram. The controller 406 includes a processor 503 communicating with storage 505 over a bus system 509. In general, the controller 406 will handle a fair amount of data, some of which may be relatively voluminous by nature and which is processed quickly. Thus, certain types of processors may be more desirable than others for implementing the processor 503. For instance, a digital signal processor ("DSP") may be more desirable for the illustrated embodiment than will be a general purpose microprocessor. In some embodiments, the processor 503 may be implemented as a processor set, such as a microprocessor with a mathematics co-processor.

The storage 505 may be implemented in conventional fashion and may include a variety of types of storage, such as a hard disk and/or random access memory ("RAM"). The storage 505 will typically involve both read-only and writable memory implemented in disk storage and/or cache. Parts of the storage 505 will typically be implemented in magnetic media (e.g., magnetic tape or magnetic disk) while other parts may be implemented in optical media (e.g., optical disk). The present invention admits wide latitude in implementation of the storage 505 in various embodiments. The storage 505 is also encoded with an operating system 521, the image 527, an automatic target recognition ("ATR") system 530, and a guidance navigation control ("GNC") application 533. The processor 503 runs under the control of the operating system ("OS") 521, which may be practically any operating system known to the art.

The controller 406 receives the image 527 from the electronics 415 of the receiver 403 (shown in FIG. 4) and stores it on the storage 505. The image 527 may be stored in any suitable type of data structure known to the art, such as first-in, first-out ("FIFO") queue. The GNC application 533 then takes the data and issues suitable GNC commands to the flight control mechanism 409. The nature of the GNC commands will be dependent on the implementation of the flight control mechanism 409, which is further discussed immediately below.

Returning to FIG. 4, the flight control mechanism 409 is shown as comprising a plurality of flight control surfaces 421—i.e., fins—and their actuators 424. As will be appreciated by those in the art having the benefit of this disclosure, many types of flight control mechanisms may be employed. Many of these types, such as fins and canards, employ flight control surfaces. Others do not, however. For instance, some weapons might employ thrusters in addition to or in lieu of flight control surfaces. The invention is not limited by the nature of the flight control mechanism employed. Similarly, the number of components within the flight control mechanism 409 is not material. For instance, the weapon 121 might employ three, four, or more flight control surfaces 421 or as many as 12 thrusters. Thus, the flight control surfaces 421 are, by way of example and illustration, but one means for controlling the flight of the weapon 121 in accordance with the present invention.

Referring now to both FIG. 4 and FIG. 5, the GNC application 533 issues 2C commands to the actuators 424. The flight control surfaces 421 rotate on pins (not shown) relative to the fuselage (also not shown) of the weapon 121 to control the flight path of the weapon 121 in pitch, yaw, and roll. Thus, in the illustrated embodiment, the 2C commands to the actuators are commands to rotate the flight control surfaces 421 and affect the desired changes in the flight path. In the illustrated embodiment, the flash detector array 412 is "strapped down", i.e., it does not move relative to the rest of the weapon 121. The desired changes in the illustrated embodiment therefore typically are intended to center the impingement 600, first shown in FIG. 6A, as is shown in FIG. 6B.

Returning now to FIG. 1A, the distance from the weapon 121 to the target 112 in this mode of operation is relatively long, and this mode of operation is therefore referred to herein as the "long range" mode. Because of the "long range," the impingement 600, shown in FIG. 6A-FIG. 6B, is on only a small portion of the detector array 418. Thus, the impingement 600 occupies only a few of the detectors 418. In this long range portion of the scenario 100, the weapon 121 is guided to the target 112 by centering the target designation 109 reflected from the target 112 in a manner analogous to that found in conventional SAL systems. The difference, as described more fully above, lies in the detection of the target designation 109.

Turning now to FIG. 1B, as the weapon 121 approaches the target 112, it enters what is referred to herein as a short range mode of operation. (Note that FIG. 1B shows the size of the designator spot 127 relative to the target 112.) The shorter distance between the weapon 121 and the target 112 has two consequences relative to the present invention.

Figure 7:
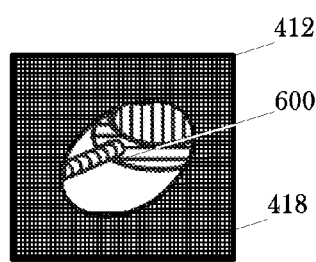
FIG. 7 illustrates the detection of the target designation in FIG. 1B as the weapon homes on the target in the second, short range mode of operation.

The first consequence, as is shown in FIG. 7, is that the impingement 600 covers a proportionately larger area of the flash detector array 412. That is, the target designation 109 impinges upon a larger number of the detectors 418. Note the level of detail in the impingement 600 in FIG. 7, in which the system is operating in the short range mode, relative to that in the impingement 600 in FIG. 6A-FIG. 6B, in which the system is operating in long range mode. Note also that, in FIG. 7, the impingement 600 is shown centered in the flash detector array 412. This is desirable since the flash detector array 412 is strapped down in this particular embodiment.

Second, the "relative ranges" associated with the impingement in the detectors 418 may now be determined from the range differences between each detector 418 of the impingement 600 on the respective detectors 418. For instance, consider FIG. 8, which shows the target 112, a tank in this case, isolated from the field of view 118. The face 130 of the hull 133 is closer to the weapon 121, and hence the flash detector array 412, than is the face 136 of the turret 139. At close enough range, this difference in distance will yield a measurable difference in the intensity of the impingement 600 in the respective detectors 418 known as "relative range." That is, the portion of the impingement 600 reflected from the face 130 will differ in intensity from the portion of the impingement reflected from the face 136. From this difference in intensity, a difference in the ranges to the reflecting surfaces can be determined.

The differences in these ranges are referred to as "relative ranges", as opposed to "absolute ranges". Determination of absolute ranges requires accurate knowledge of the position of the laser source relative to the detector so that flight times of the laser signal can de accurately determined. Absolute ranges to the faces can be expressed in concrete numbers, for example, 26.7 m to the face 130 and 28.3 m to the face 136. Relative ranges can be expressed relative to some, unknown base range. For instance, the range to the face 130 might be represented as an unknown variable $R_1$ and the range to the face 136 expressed relative to that range, i.e., a relative range $R_2 = R_1 + 1.6$ m. The determination and application of relative ranges in this fashion is well known in the art.

Active LADAR systems typically use absolute ranges because the laser source is on-board, and therefore known. Conventional SAL systems, however, do not use ranges of any kind. First, absolute ranges are not used because the position of the laser source cannot be sufficiently known. Second, the quad cell detectors that they employ did not yield enough information to determine even relative ranges. Thus, the use of relative ranges in a SAL system constitutes a marked departure from conventional practice.

Furthermore, the work on relative ranges known to the art is relatively old. Relative ranges were used prior to the advent of practical approaches that yield absolute ranges. However, since the introduction of practical absolute range techniques approximately 20 years ago, the art has consistently moved forsaken the use of relative ranges in favor of absolute ranges. Thus, not only is the use of relative ranges in a SAL system a marked departure, but it also contravenes the conventional wisdom in the art and the long and consistent trend to absolute ranges.

Thus, the two consequences of the shorter distance between the weapon 121 and the target 112 are (1) a large area impingement, and (2) intensity discrimination sufficient for relative range determination. These two consequences mean that the weapon 121 can then image the target 112 sufficiently for the ATR 530, shown in FIG. 5, to return meaningful results. The GNC application 533 can then aim the weapon 121 at a specific aim point 800, shown in FIG. 8, as will now be discussed.

Returning now to FIG. 5, the image 527 actually comprises a two-dimensional data array in a row column format. Each data point in the array comprises an intensity value and a relative range value for a pixel in the corresponding row/column position of a detector 418 in the flash detector array 412. In the illustrated embodiment, this is true in both modes of operation even though, as mentioned above, there are too few detectors 418 impinged upon to provide sufficient discrimination in the long range mode for the operation of the ATR 530. Also in this mode, the ATR 530 works continuously throughout the scenario 100, i.e., during both the long range and short range modes. However, when the range is short enough to yield values sufficient to discriminate such that the ATR 530 returns valid results, the scenario 100 shifts from the long range mode, shown in FIG. 1A, to the short range mode, shown in FIG. 1B.

Figure 9:
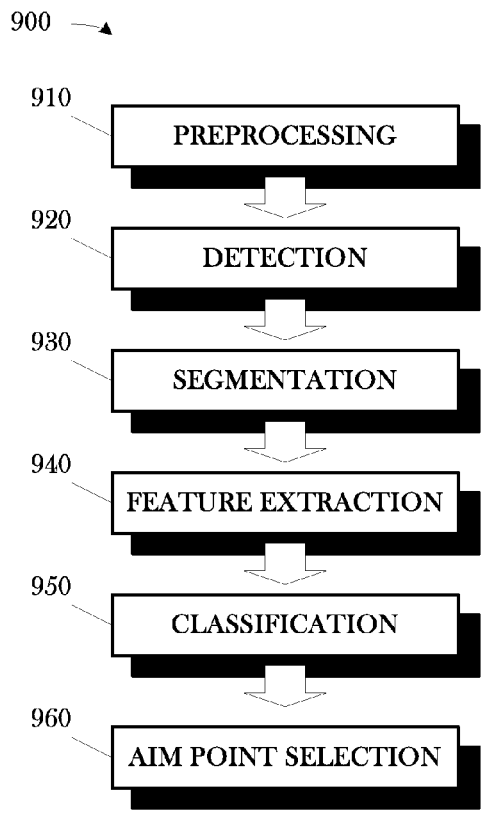
FIG. 9 illustrates the operation of the automatic target recognition system first shown in FIG. 5 in the short range mode of operation shown in FIG. 1B.

The ATR 530 may be any suitable ATR known to the art for use in imaging LADAR systems. However, as mentioned above, ATRs have not previously been employed in SAL systems. The ATR 530 will therefore need to be ported to the weapon 121 as part of a modification thereto unless the design of the weapon 121 is modified to incorporate the ATR 530 in future implementations. Again, those ordinarily skilled in the art should be able to readily effect such modifications with the benefit of the present disclosure. The operation of the ATR 530 is illustrated in a general fashion in FIG. 9, and can generally be separated into preprocessing (at 910), detection (at 920), segmentation (at 930), feature extraction (at 940), classification (at 950), and aim point selection (at 960). Each of these steps shall now be discussed further.

Generally, the preprocessing (at 910) is directed to minimizing noise effects, such as identifying so-called intensity dropouts in the image 527, where the range value of the data is set to zero. Noise in the image 527 introduced by low signal-to-noise ratio ("SNR") conditions is processed so that performance of the overall LADAR system is not degraded. In this regard, the image 527 is used so that range measurement distortion is minimized, edge preservation is maximized, and preservation of texture step (that results from actual structure in objects being imaged) is maximized.

In general, detection (at 920) identifies specific regions of interest in the image 527. The detection (at 920) uses range cluster scores as a measure to locate flat, vertical surfaces in an image. More specifically, a range cluster score is computed at each pixel to determine if the pixel lies on a flat, vertical surface. The flatness of a particular surface is determined by looking at how many pixels are within a given range in a small region of interest. The given range is defined by a threshold value that can be adjusted to vary performance. For example, if a computed range cluster score exceeds a specified threshold value, the corresponding pixel is marked as a detection. If a corresponding group of pixels meets a specified size criteria, the group of pixels is referred to as a region of interest. Regions of interest, for example those regions containing one or more targets, are determined and passed for segmentation (at 930).

Segmentation (at 930) determines, for each detection of a target 112 (shown in FIGS. 1A-FIG. 1B), which pixels in a region of interest belong to the detected target 112 and which belong to the detected target's background. Segmentation (at 930) identifies target pixels, for example, those that exceed a height threshold above the ground plane. More specifically, the segmentation (at 930) separates target pixels from adjacent ground pixels and the pixels of nearby objects, such as bushes and trees.

Feature extraction (at 940) provides information about a segmentation (at 930) so that the target 112 and its features in that segmentation can be classified (at 950). Features include, for example, orientation, length, width, height, radial features, turret features, and moments. The feature extraction (at 940) also typically compensates for errors resulting from segmentation (at 930) and other noise contamination. Feature extraction (at 940) generally determines a target's three-dimensional orientation and size and a target's size. The feature extraction (at 940) may also distinguish between targets and false alarms and between different classes of targets. However, such concerns are greatly lessened than in conventional imaging LADAR systems because it can be assumed from the initial target designation 109 by the operator 218, shown in FIG. 2, that the target 112 is, in fact, a target. Nevertheless, some implementations may give the right to call off an attack to the weapon 121.

Classification (at 950) classifies segmentations (at 930) to contain particular targets, usually in a two stage process, from the extracted (at 940) features. First, features such as length, width, height, height variance, height skew, height kurtosis, and radial measures are used to initially discard non-target segmentations. The segmentations that survive this step are then matched with true target data stored in a target database (not separately shown). The data in the target database, for example, may include length, width, height, average height, hull height, and turret height to classify a target. The classification (at 950) is performed using known methods for table look-ups and comparisons.

Figure 8:
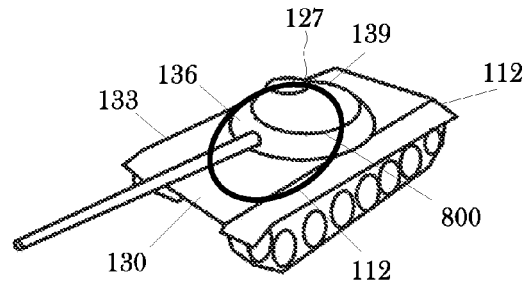
FIG. 8 depicts one particular embodiment of the target in FIG. 1A-FIG. 1B during the homing in FIG. 1B.

The data obtained from the segmentation (at 930) is then used in identifying, or "recognizing," the target and selecting (at 960) an aim point, e.g., the aim point 800, shown in FIG. 8. One suitable method for this identification is disclosed in United States Letters Patent 5,893,085, entitled "Dynamic Fuzzy Logic Process for Identifying Objects in Three-Dimensional Data," issued Apr. 6, 1999, to Lockheed Martin Corporation as the assignee of the inventors Ronald W. Philips, et al. This document is hereby incorporated by reference for all purposes as if expressly set forth verbatim herein.

More particularly, the relative strengths and weaknesses of many potential targets are frequently studied and identified. A particular "make and model" of vehicle might be relatively lightly armored over an engine compartment, or the juncture between the turret and body might be relatively susceptible to attack, for example. This information can also be stored in the target database such that, once the ATR 503 identifies the target, it can determine the best point at which to aim the weapon 121 at that particular target 112. It may be that aim points for some classes of targets will not be readily identifiable. Bunkers and munitions depots, for instance, may be ad hoc or show too much variation for aim points to be determined a priori. The ATR 503 may therefore include default techniques for determining aim points where there is no a priori aim point determination. For instance, the default aim point for a munitions depot might be the center of the target.

The coordinates of the selected aim point is passed to the GNC application 533, which then issues GNC commands to the flight control mechanism 409, shown in FIG. 4, appropriate to guide the weapon 121 to the aim point 800, shown in FIG. 8. Once the aim point 800 is selected, the image 527 is then used to update the relative position of the weapon 121 to the target 112 so that the weapon 121 can center the aim point 800 on the flash detector array 412. Some embodiments may choose to iterate the full ATR process described above continually or periodically.

Figure 10:
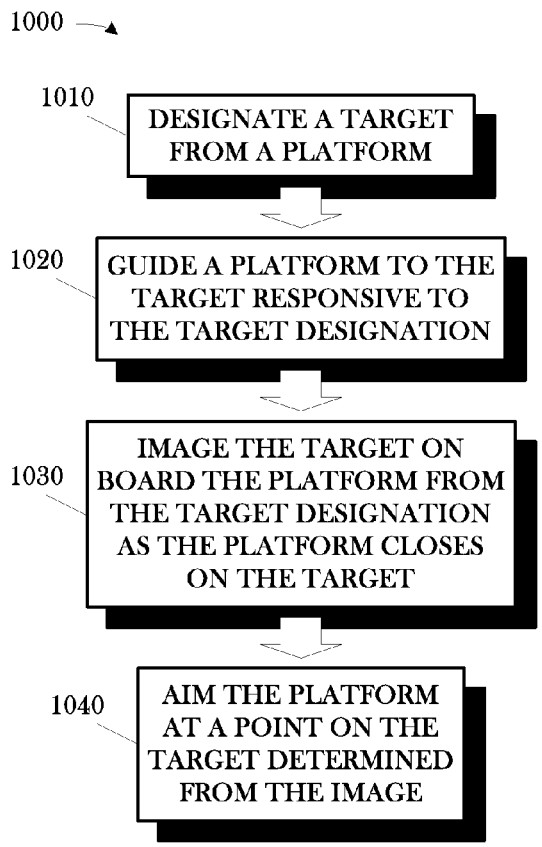
FIG. 10 illustrates a method in accordance with one aspect of the present invention.

Thus, in one aspect, the present invention comprises a method 1000, illustrated in FIG. 10. With reference now also to FIG. 1A-FIG. 1B, the method 1000 begins by first designating (at 1010) a target 112 from a platform 103. The method 100 continues by guiding (at 1010) a weapon 121 to the target 112 responsive to the target 112 designation 109. Next, the method 1000 images (at 1010) the target 112 on board the weapon 121 from the target 112 designation as the platform closes on the target 112. Finally, the method 1000 aims (at 1010) the weapon 121 at a point on the target 112 determined from the image 527.

The "predetermined range" will probably not be expressed in a number, e.g., as in "a distance of x kilometers". This would be an absolute range which, as described above, is difficult to do in a semi-active system without turning it into an active system. In the illustrated embodiment, the "predetermined range" is the range at which the ATR 530, shown in FIG. 5, returns meaningful results. The predetermined range may also alternatively be defined by, for example, the number of pixels the impingement 600 covers on the detector array 412, as shown in FIG. 7. Thus, "predetermined range" may be defined in a manner that indirectly reflects some absolute range rather than the absolute range itself.

Figure 11:
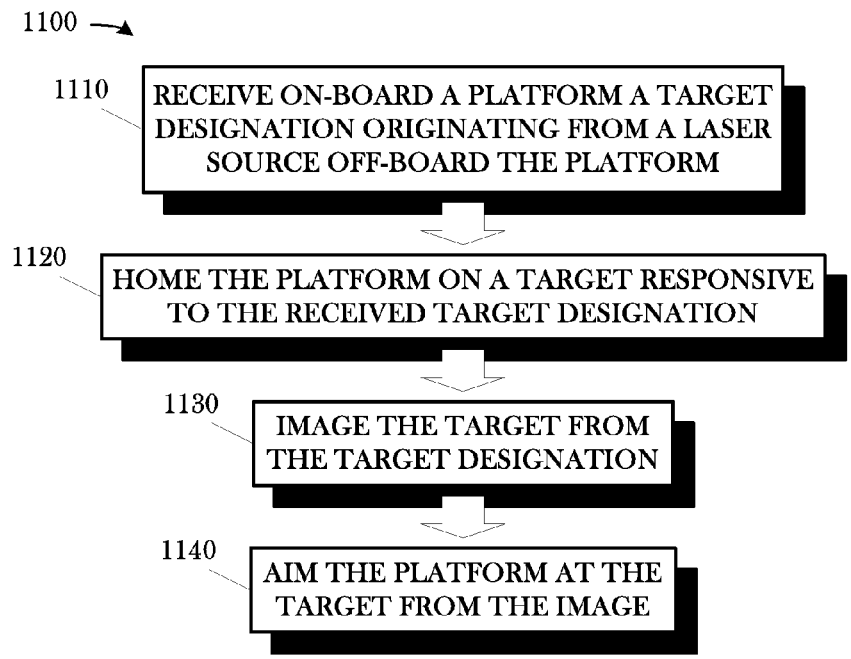
FIG. 11 illustrates a method in accordance with a second aspect of the present invention.

Note also that much of the action for the present invention occurs on the novel apparatus of the weapon 121. In another aspect, the invention includes a method 1100, illustrated in FIG. 11, performed aboard the weapon 121. The method 1100 begins by receiving (at 1110) on-board a weapon 121 a target designation 109 originating from a laser source (e.g., the designator 106) off-board the weapon 121. The method 100 continues by homing (at 1110) the weapon 121 on a target 112 responsive to the received target designation 109. Next, the method 1100 images (at 1110) the target 112 from the target designation 109 and aims (at 1110) the weapon 121 at the target 112 from the image 527.

Still referring to FIG. 1A-FIG. 1B, the scenario 100 is presented in terms of two distinct modes of operation—namely, the long range mode of FIG. 1A and the short range mode of FIG. 1B. In the illustrated embodiment, as was mentioned above, the ATR 530 begins running from the time the weapon 121 is deployed. The scenario 100 then enters the short range mode of operation whenever the ATR 530 begins returning valid information. However, in some embodiments, the operation of the ATR 530 may wait until the "predetermined range" is reached, however that predetermined range is determined. For example, the ATR 530 may wait until the impingement 600, shown in FIG. 7, reaches a certain size and then become active.

Figures 12, 13:
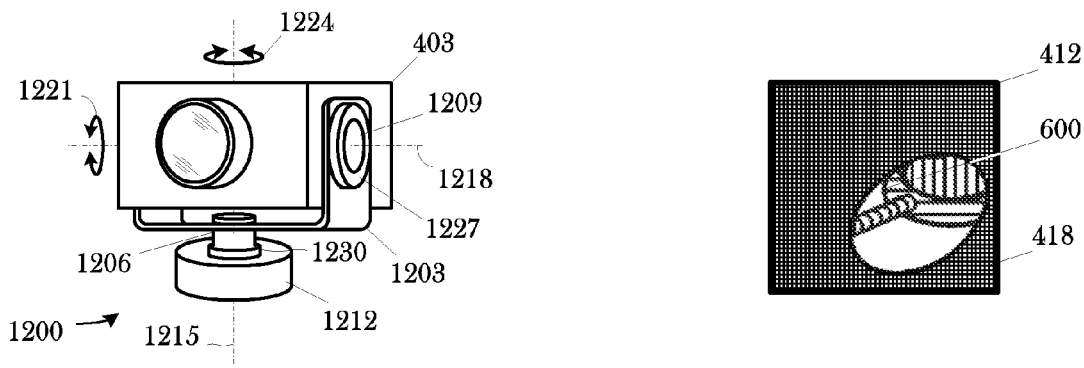
FIG. 12 depicts a gimbaled receiver as may be employed in some embodiments.
FIG. 13 depicts the detection of the target designation in FIG. 1B as the weapon homes on the target in the second, short range mode of operation with a gimbaled receiver such as the one in FIG. 12.

The invention admits variation in other respects, as well. For example, in the illustrated embodiment, the GNC application 533 seeks to center the impingement 600 on the flash detector array 412 as is shown in FIG. 6B and FIG. 7. This is a consequence of the fact that the flash detector array 412 is strapped down, or does not move relative to the rest of the weapon 121. However, in some embodiments, the receiver 403 may be gimbaled, as is shown in FIG. 12, in which the receiver 403 is mounted in a gimbal 1200. In the embodiment of FIG. 12, the receiver 403 is rotatably mounted to a bracket 1203 that is, in turn, mounted atop a rotating post 1206. The motors 1209, 1212, rotate the receiver 403 and the bracket 1203 in elevation and azimuth, respectively, about the axes 1215, 1218 respectively, as indicated by the arrows 1221, 1224, respectively. The gimbaling of the receiver 403 in FIG. 12 may be readily adapted from gimbaling systems currently used in active LADAR systems that are scanning systems. Furthermore, some flash LADAR systems are gimbaled, as well, and those gimbals may be employed here, as well.

One aspect of the gimbaling is the knowledge of where the receiver 403 is pointing. When the flash LADAR detector 412 is strapped down, it normally is positioned so that it is "pointing" down the boresight of the weapon 121. However, this will not be true in a gimbaled system most of the time. The impingement 600 might be off center on the flash detector array 412, as shown in FIG. 13, even though the weapon 121 is homing directly on the aim point 800, shown in FIG. 8, because the receiver 403 may not be pointing down the boresight. The gimbal 1200 includes sensors 1227, 1230 that measure the rotation of the receiver 403 and from which the controller 406 can determine the direction in which the receiver is pointing. This angle off boresight can be transmitted to the GNC application 533 so that the GNC application 533 can account for the discrepancy and issue the correct commands to the flight control mechanism 419.

Figure 14A:
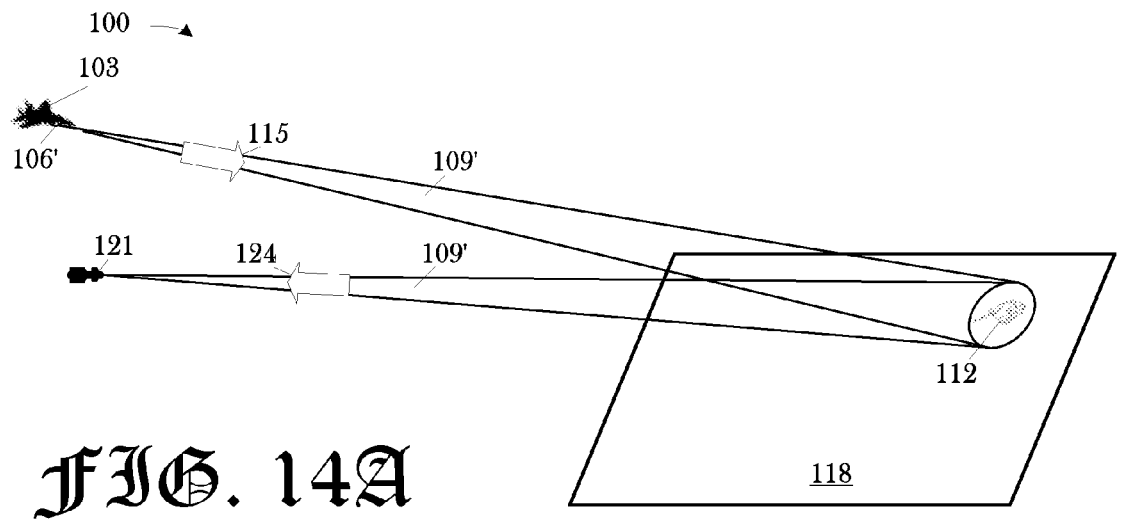
FIG. 14A-FIG. 14B illustrate a second particular scenario in accordance with a second embodiment of the present invention in long range and short range modes, respectively.
Figure 14B:
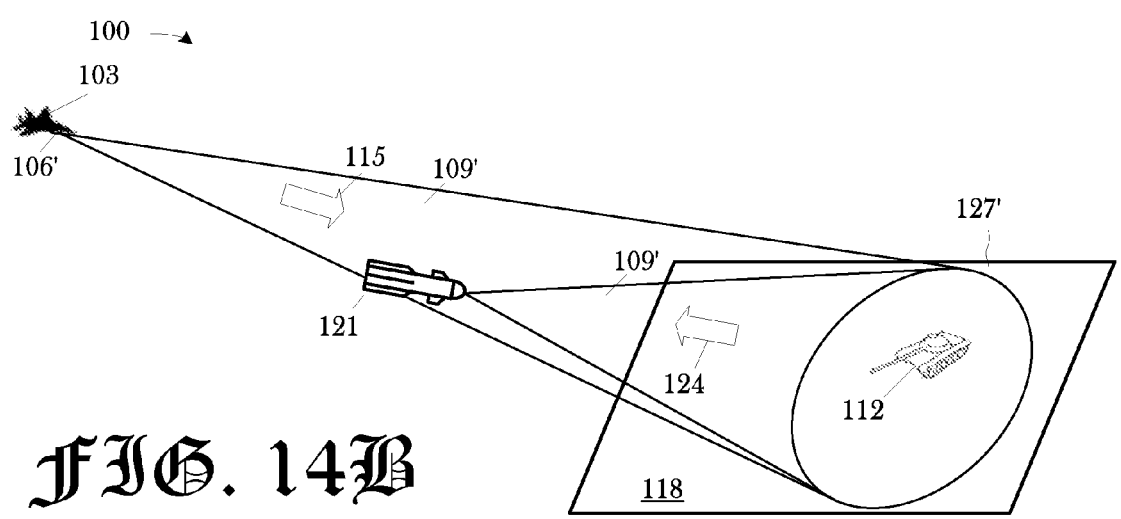

Yet another variation is shown in FIG. 14A-FIG. 14B, in which the designator 106' is modified so that the resultant target designation 109' is slightly defocused. Note that existing laser designators will need to be modified somewhat to achieve this state, for example by modifying the lens form, unless they have some kind of zoom capability. The modification should defocus, or reduce magnification, by a factor of between 5 and 20. This will be defocus the laser designation 109' such that the full angle of the laser designation will be between 5 to 20 times the original laser designation full angle and will result in the spot 127' being between 5 and 20 times larger in diameter than the spot 127 in the embodiment of FIG. 1A-FIG. 1B. Thus, the term "slightly defocused" means defocused relative to currently deployed target designators within the parameters described above. The larger spot 127' will therefore typically include not only the target 112, but also portions of the ground surrounding the target. The larger diameter spot 127' will permit transition into the second, short range mode earlier in the scenario 100' than in the scenario 100 of FIG. 1A-FIG. 1B. It will also permit better imaging that will yield, in turn, a better aim point selection.

Note that some portions of the detailed descriptions herein are presented in terms of a software implemented processes involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:
   receiving on-board a platform a target designation originating from a semi-active laser source off-board the platform;
   homing the platform on a target responsive to the received target designation;
   imaging the target from the target designation; and
   aiming the platform at a point on the target selected from the image.

2. The method of claim 1, wherein receiving the target designation includes receiving a focused target designation.

3. The method of claim 1, wherein receiving the target designation includes receiving a defocused target designation.

4. The method of claim 1, wherein homing the platform includes guiding the platform to center an impingement on a detector.

5. The method of claim 1, wherein homing the platform includes guiding the platform to center the platform's boresight on the target.

6. The method of claim 5, wherein guiding the platform includes guiding the platform from an impingement on a detector that is not centered.

7. The method of claim 1, wherein homing the platform includes:
   detecting the target designation; and
   processing the detected target designation to determination the location of the target with a field of view.

8. The method of claim 1, wherein imaging the target includes:
   storing an image derived from the impingement of the target designation on a flash LADAR detector array; and
   automatically recognizing the target from the stored image.

9. The method of claim 8, wherein aiming the platform includes:
   selecting an aim point from the recognized target; and
   guiding the platform to the selected aim point.

10. The method of claim 9, wherein selecting the aim point includes selecting an aim point determined a priori for the recognized target.

11. The method of claim 9, wherein selecting the aim point includes selecting an aim point determined by default for the recognized target.

12. The method of claim 1, wherein aiming the platform includes:
   selecting an aim point from the imaged target; and
   guiding the platform to the selected aim point.

13. The method of claim 12, wherein selecting the aim point includes selecting an aim point determined a priori for the imaged target.

14. The method of claim 12, wherein selecting the aim point includes selecting an aim point determined by default for the imaged target.

15. The method of claim 1, further comprising at least one of:
   deploying the platform;
   detonating the platform; and
   updating the target's position over time.

16. The method of claim 1, wherein the platform is a weapon.

17. A method, comprising:
   semi-actively designating a target from a first platform;
   guiding a second platform to the target responsive to the target designation;
   imaging the target on board the second platform from the target designation as the platform closes on the target;
   and aiming the second platform at a point on the target determined from the image.

18. The method of claim 17, wherein designating the target includes designating the target with a focused target designation.

19. The method of claim 17, wherein designating the target includes designating the target with a defocused target designation.

20. The method of claim 17, wherein guiding the second platform includes guiding the second platform to center an impingement on a detector.

21. The method of claim 17, wherein guiding the second platform includes guiding the second platform to center the platform's boresight on the target.

22. The method of claim 17, wherein guiding the second platform includes:
   detecting the target designation;
   and processing the detected target designation to determination the location of the target with a field of view.

23. The method of claim 17, wherein imaging the target includes:
   storing an image derived from the impingement of the target designation on a flash LADAR detector array; and
   automatically recognizing the target from the stored image.

24. The method of claim 17, wherein aiming the second platform includes:
   selecting an aim point from the imaged target; and
   guiding the second platform to the selected aim point.

25. An apparatus, comprising:
   a receiver capable of receiving and imaging a target designation originating from a semi-active laser source off-board the apparatus;
   at least one flight control mechanism;
   and a controller capable of processing a received target designation and issuing navigation control guidance commands to the flight control mechanism to:
      home the apparatus on a target responsive to a received target designation;
      and aim the apparatus at a point on the target selected from the image of the target.

26. The apparatus of claim 25, wherein the receiver includes a flash LADAR detector array and associated electronics for receiving the target designation.

27. The apparatus of claim 26, wherein the flash LADAR detector array is strapped down.

28. The apparatus of claim 26, wherein the flash LADAR detector array is gimbaled.

29. The apparatus of claim 25, wherein the flight control mechanism includes at least one of flight control surfaces and thrusters.

30. The apparatus of claim 25, wherein the controller includes:
   a processor;
   a bus system over which the controller receives the image from the receiver and issues guidance navigation control commands to the flight control mechanism; and
   a storage communicating with the processor over the bus system and encoded with:
      the image generated from the received target designation;

an automatic target recognition system capable of acting on the image to identify the target and select an aim point therefore; and a guidance navigation control application that generates guidance navigation control commands to home the apparatus responsive to the target designation and aim the apparatus at the aim point.

31. An apparatus, comprising:

means for receiving and imaging a target designation originating from a semi-active laser source off-board the apparatus;

means for controlling the flight of the apparatus; and means for processing a received target designation and issuing navigation control guidance commands to the flight control means to:

home the apparatus on a target responsive to a received target designation; and aim the apparatus at a point on the target selected from the image of the target.

32. The apparatus of claim 31, wherein the receiving and imagine means includes a flash LADAR detector array and associated electronics for receiving the target designation.

33. The apparatus of claim 32, wherein the flash LADAR detector array is strapped down.

34. The apparatus of claim 32, wherein the flash LADAR detector array is gimbaled.

35. The apparatus of claim 31, wherein the flight control means includes at least one of flight control surfaces and thrusters.

36. The apparatus of claim 31, wherein the processing and issuing means includes:

a processor;

a bus system over which the controller receives the image from the receiver and issues guidance navigation control commands to the flight control mechanism; and a storage communicating with the processor over the bus system and encoded with:

the image generated from the received target designation;

an automatic target recognition system capable of acting on the image to identify the target and select an aim point therefore; and a guidance navigation control application that generates guidance navigation control commands to home the apparatus responsive to the target designation and aim the apparatus at the aim point.

37. A weapon, comprising:

a flash LADAR detector array and associated electronics capable of receiving and imaging a target designation originating from a semi-active laser source off-board the apparatus;

at least one flight control mechanism; and a controller, including:

a processor;

a bus system over which the controller receives the image from the receiver and issues guidance navigation control commands to the flight control mechanism; and a storage communicating with the processor over the bus system and encoded with:

the image generated from the received target designation;

an automatic target recognition system capable of acting on the image to identify the target and select an aim point therefore; and a guidance navigation control application that generates guidance navigation control commands to home the apparatus responsive to the target designation and aim the apparatus at the aim point.

38. The apparatus of claim 37, wherein the flash LADAR detector array is strapped down.

39. The apparatus of claim 37, wherein the flash LADAR detector array is gimbaled.

40. The apparatus of claim 37, wherein the flight control mechanism includes at least one of flight control surfaces and thrusters.

41. An apparatus, comprising:

means for receiving on-board a platform a target designation originating from a semi-active laser source off-board the platform;

means for homing the platform on a target responsive to the received target designation;

means for imaging the target from the target designation; and means for aiming the platform at a point on the target selected from the image.

42. The apparatus of claim 41, wherein the receiving means includes means for receiving a focused target designation.

43. The apparatus of claim 41, wherein the receiving means includes means for receiving a defocused target designation.

44. The apparatus of claim 41, wherein the homing means includes:

means for detecting the target designation; and means for processing the detected target designation to determination the location of the target with a field of view.

45. The apparatus of claim 41, wherein the imaging means includes:

means for storing an image derived from the impingement of the target designation on a flash LADAR detector array; and means for automatically recognizing the target from the stored image.

46. The apparatus of claim 41, wherein the aiming means includes:

means for selecting an aim point from the imaged target; and means for guiding the platform to the selected aim point.

* * * * *